United States Patent [19]

Clancy et al.

[11] 3,906,424
[45] Sept. 16, 1975

[54] COOKING RANGE AND CONTROL THEREFOR

[75] Inventors: Raymond W. Clancy; John W. Huffman, both of Mansfield, Ohio

[73] Assignee: Therm-O-Disc Incorporated, Mansfield, Ohio

[22] Filed: May 13, 1974

[21] Appl. No.: 469,049

[52] U.S. Cl. ............... 337/394; 219/506; 337/332; 337/370; 337/376
[51] Int. Cl.² ................... H05B 1/02; H01H 37/48
[58] Field of Search ........... 219/453, 457, 506, 449, 219/450, 451; 337/79, 332, 370, 376, 394

[56] References Cited
UNITED STATES PATENTS

| | | | |
|---|---|---|---|
| 2,924,700 | 2/1960 | Huffman | 337/394 |
| 3,612,826 | 10/1971 | Deaton | 219/506 |
| 3,624,352 | 11/1971 | Deaton | 219/449 |

*Primary Examiner*—L. T. Hix
*Assistant Examiner*—Fred E. Bell
*Attorney, Agent, or Firm*—McNenny, Farrington, Pearne & Gordon

[57] ABSTRACT

A cooking range and control therefor is disclosed in which the range is provided with a ceramic glass range top, the upper surface of which operates to support and heat cooking utensils or the like. Heating units are located below selected parts of the range top to supply heat to the lower surface thereof. A probe-type thermostat is positioned to sense the temperature of the adjacent portion of the range top. The thermostat operates through a first switch to energize a warning light whenever the temperature of the range top exceeds a temperature of about 150°F. to warn the range user that burns can occur if the range top is accidentally touched. The thermostat operates through a second switch to terminate or limit the operation of the heating element when the range top reaches a temperature above the cooking temperatures normally encountered, but below the temperature at which the range top material can be damaged. A single temperature sensing assembly functions to operate both of the thermostatic switches.

11 Claims, 3 Drawing Figures

1

COOKING RANGE AND CONTROL THEREFOR

BACKGROUND OF THE INVENTION

This invention relates generally to cooking ranges or the like and more particularly to a novel and improved range control system and to a novel and improved thermostat for such system.

PRIOR ART

Electric ranges having a smooth range top formed of ceramic glass or the like are well known. In such ranges, it is customary to provide heating elements to supply heat to the lower surface of the range top which in turn supports and heats a cooking utensil. When the utensil is resting properly on the cooking surface, provided by the upper surface of the ceramic glass range top, heat is transferred from the range top to the utensil at a sufficient rate to maintain the range top temperatures at safe levels. However, if the heating element is operated for any period of time without a utensil to remove the heat from the range top, or with a warped utensil which does not properly contact the range top, excessive temperatures can occur and the ceramic glass range top material can be damaged.

To prevent the occurrence of such damaging excessive temperatures, thermostat controls have been positioned to sense the temperature of the ceramic glass range top and are connected to either shut off or limit operation of the heating element whenever the range top exceeds a predetermined safe maximum temperature.

One thermostat which has been used for this purpose is disclosed on the U.S. Pat. No. 3,732,518 (assigned to the assignee of the present invention). In one typical installation of such thermostat, the temperature sensing probe is positioned immediately adjacent to the lower surface of the ceramic glass range top. The thermostat provides normally closed contacts which are calibrated to open and interrupt the operation of the heating element when the range top reaches a maximum safe operating temperature, for example about 1050°F. The maximum operating temperature is selected to be high enough to permit normal operation of the heating element when a cooking utensil is properly positioned on the cooking surface, but low enough to prevent the range top material from reaching damaging high temperatures.

A problem has been encountered in the use of such smooth top ranges since the person using the range cannot usually determine if the cooking surface is hot enough to cause a burn if it is accidentally touched. This is an important problem since the users of such ranges often use the range cooking surface as additional counter working space when the range is not in use.

SUMMARY OF THE INVENTION

The present invention provides a range control system in which a single thermostat provides overtemperature protection and also provides the range user with a warning signal whenever a particular range top portion is at a temperature sufficiently high to cause accidental burns.

In the illustrated embodiment, the range is provided with a smooth imperforate ceramic glass range top surface on which cooking utensils are positioned and heated. Located below selected portions of the range top are heating elements which operate to heat the adjacent portions of the ceramic glass range top. A probe type thermostat is mounted with its probe positioned immediately adjacent to the lower surface of the range top to sense the temperatures thereof.

The temperature sensing probe is connected to operate two separate electrical switches. A first of such switches is calibrated to be normally open at normal environmental temperatures but to be closed by the sensing probe when the probe senses a range top temperature in the order of 150°F. Such first switch is connected to a warning light which operates whenever the associated section of the range top exceeds such a predetermined temperature. This warns the user against accidental touching of the range top. The operating temperature is selected so that the user does not receive a burn if the associated portion of the range top is momentarily touched as long as the warning light is not operating.

The second switch contacts of such thermostat are operated by the probe sensor when it senses a predetermined high temperature which is sufficiently low to prevent damage to the range top surface but sufficiently high so that the contacts do not open under normal cooking conditions. These contacts are connected to control the operation of the heating element and either terminate or limit its operation when the predetermined high safe temperature is reached.

In such system, a single thermostat having a single sensing unit operates two different switch mechanisms at two different temperatures to provide the warning to the user to prevent accidental burns and also to provide the control which limits the operation of the heaters to prevent damaging high temperatures of the range top.

DETAILED DESCRIPTION OF THE DRAWINGS

Figure 1:
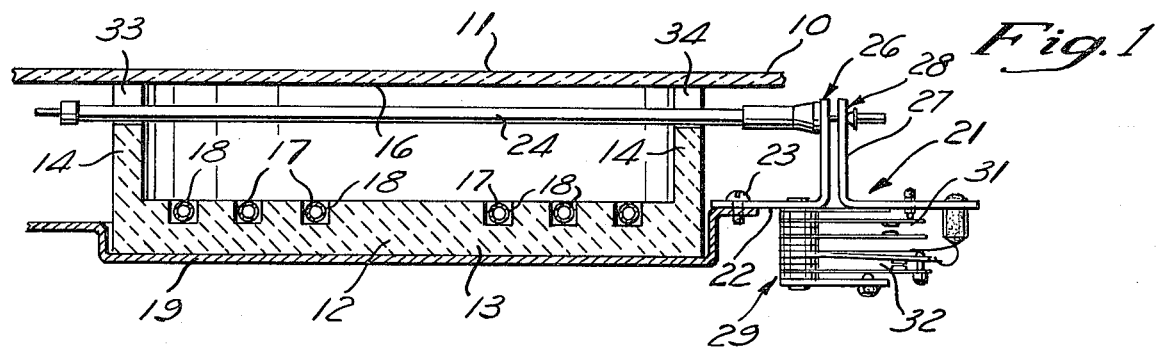
FIG. 1 is a fragmentary schematic illustration of a range system incorporating this invention illustrating the ceramic glass range top, the heating element and the control thermostat.

FIG. 1 schematically illustrates one heating unit assembly of an electric cooking range incorporating the present invention. In a typical range, there are four separate cooking units located at spaced positions with respect to the top of the stove. A single ceramic glass range top is provided to cover the entire top of the range with a plurality of cooking units as illustrated in FIG. 1 located at spaced locations under the top of the range. In FIG. 1, a portion of the range top 10 is illustrated. The upper surface 11 is uninterrupted and smooth and provides the cooking surface on which cooking utensils are positioned and heated. The range top can be formed of any suitable heat conducting material. However, the practice is generally to form the range top 10 of a single smooth sheet of ceramic glass material.

Positioned below the range top 10 is a generally cup-shaped insulating body 12 having a relatively thick bottom section 13 and upstanding side portions 14 which extend up into engagement with the lower surface 16 of the range top 10. The insulating body is preferably cast from a ceramic type material which has good insulating properties as well as the ability to withstand relatively high temperatures.

Positioned in annular grooves 17 formed in the end wall 13 of the insulating body 12 are electrical resistance heaters 18 which operate when energized to heat the lower surface 16 of the range top 10. The walls 14 of the insulating body 10 tend to confine the heat from the heating elements 18 to the portion of the range top 10 within the circular wall 14. A portion of the range frame 19 is provided to support the insulating body 12 in position.

A thermostat 21 provided with a frame 22 is mounted on the range frame 19 by suitable means such as a screw 23. A probe assembly 24 is provided by the thermostat with the tube of the probe connected by a swivel connection at 26 to the frame 22 and the rod of the probe connected to the control arm 27 by a swivel connection 28. Reference may be made to the U.S. Pat. No. 3,732,518 cited above for a more complete discussion of the structure of the basic thermostat 21 and the swivel mounting of the probe assembly 24.

A thermostat provides a stack contact assembly 29 providing two separate switch assemblies 31 and 32. The probe 24 extends through vertical notches 33 and 34 formed in the side walls 14 and is positioned immediately adjacent to the lower surface 16 of the range top 10 so that it senses the temperature of the lower surface 16. By utilizing a probe assembly which extends completely across a diameter of the insulating body 12, the probe assembly is sensitive to the average temperature condition which exists. This eliminates the potential problem of providing a thermostat sensor which senses only that temperature existing at a particular small location.

It is recognized that the probe, in addition to sensing the temperature of the lower surface of the range top, also senses the temperature of the heater and the remaining environment. However, since the range top provides the principal surface through which heat flows from the chamber to be enclosed by the range top in the insulating body, the temperature of the environment of the probe varies with the temperature of the range top, and the temperature sensed by the probe is directly related to the range top temperature.

The particular arrangement of the heating unit of FIG. 1 is illustrated as one typical heating unit arrangement. It should be understood that other arrangements are used and that the present invention is not limited to the particular type illustrated in FIG. 1. For example, the heaters are sometimes fastened directly to the lower surface of the range top or are positioned closely adjacent to such surface. In such installations, the probe is usually below the heaters.

Figure 2:
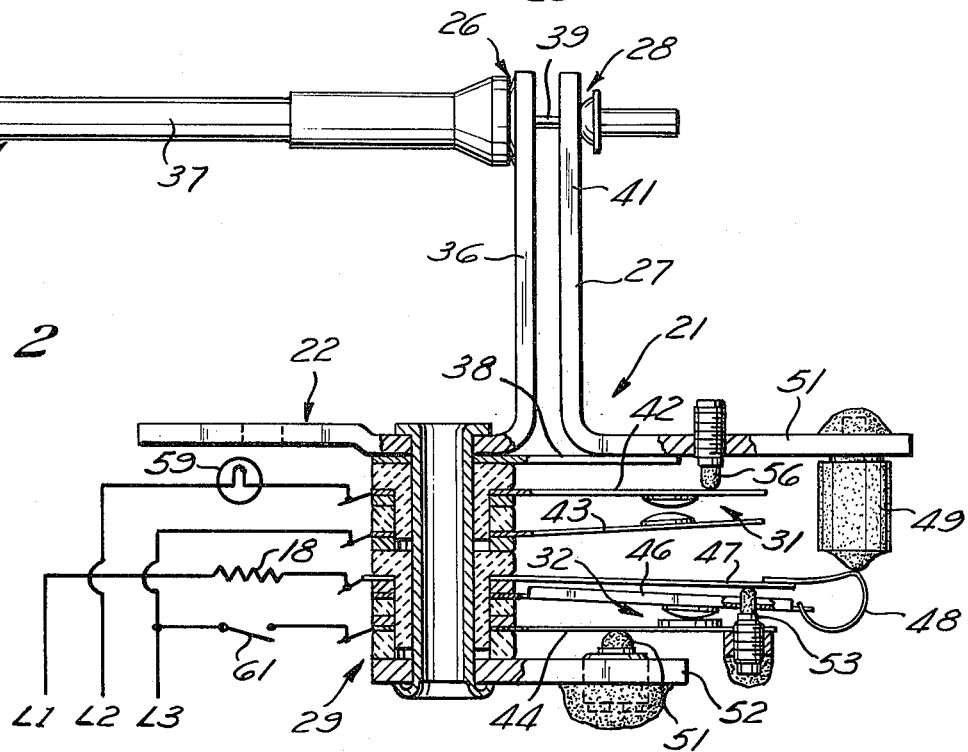
FIG. 2 is an enlarged side elevation of the thermostat control illustrated in FIG. 1 diagrammatically illustrating the wiring of a typical control circuit.

Referring to FIG. 2, the frame 22 of the thermostat 21 is provided with an upstanding arm 36 which supports the tube 37 of the probe assembly 24, and longitudinally positions the adjacent end of the tube with respect to the range assembly. The operator 27 is supported from the frame by a spring arm 38 which functions as a pivotal type connection to permit rotation type movement between the operator 27 and the frame 22. The rod 39 of the probe assembly is connected to an upstanding projection 41 on the operator 27 to cause it to move with a pivotal like movement as the probe senses different temperatures.

The stack of the thermostat provides two contact arms 42 and 43 which cooperate to provide the first switch 31. The second switch 32 is provided with two contact arms 44 and 46 and a spring arm 47 of an overcenter spring 48. An insulating bumper 49 is carried by the lateral extending arm 51 of the operator 21 and functions to engage and operate the overcenter spring 48 when moved by the operator 21 to predetermined operating positions.

The calibration of the operating temperature of the switch 32 is determined by an adjustable projection 51 mounted in a frame element 52 to position the arm 44 with respect to the frame of the system. A second adjustable projection 53 is carried by the arm 44 and functions to determine the relative position between the support 47 and the arm 41.

The two projections 51 and 53 are adjusted during manufacture so that the switch 32 will snap open upon reaching a predetermined high temperature for example, 1100°F. The overcenter spring 48 functions to give the switch 32 a snap action.

An insulating bumper 56 is carried by the projection 51 and adjustably determines the position of the arm 42 with respect to the projecting arm 51. This bumper is adjusted during the manufacture of the thermostat so that the switch 31 closes when the temperature sensed by the probe exceeds about 150°F. and remains in a normal open position at lower temperatures.

In a typical simple circuit, the power to the range is supplied through three lines L1, L2, and L3. The voltage between the line L2 and either of the lines L1 or L3 is usually 110 volts, and the voltage between the lines L1 and L3 is usually 220 volts. The line L1 is connected through an indicator lamp 59 to one side of the switch 31 while the other side of the switch 31 is connected to either line L3, as illustrated, or the line L1.

Whenever the temperature sensed by the probe exceeds the calibration temperature of the switch 31, such as 150°F., the switch closes and lights the indicator bulb 59 to provide the range user with a warning that the range top portion associated with the particular heater and thermostat is sufficiently hot to present a danger of burn in the event that the top is touched. The switch 31 remains closed to operate the light 50 whenever the temperature of the associated portion of the range top 10 exceeds the calibration temperature of the switch 31. Thus, during the heating phase of operation, the indicator light comes on as soon as the risk of burn is presented and remains on even after the heating elements 18 are shut off until the range top cools to a safe temperature. When the indicator light goes out, it is safe for the user of the range to touch the range top and use it as an additional counter space.

The switch 32 is a normally closed switch which remains closed until the probe 24 senses the calibration temperature thereof. The calibration temperature of the switch 32 is selected so that normal use of the cooking unit wherein a utensil is properly removing heat from the associated portion of the range top does not cause the switch 32 to open. However, if the utensil is not properly removing the heat or if the heating unit is operated in the absence of a cooking utensil, the associated portion of the range top reaches the calibration temperature of the switch 32 before any excessive damaging temperature is reached. The circuit for connecting the switch 32 includes a control switch 61 connected between the line L3 and the switch arm 44. The heater element 18 is connected between the line L1 and the switch arm 46. Therefore, when the switch 61 is closed, the heater element 18 is energized as long as the switch 32 remains closed. If the switch 32, however, opens further, operation of the heater element cannot occur until the switch 32 recloses.

Figure 3:
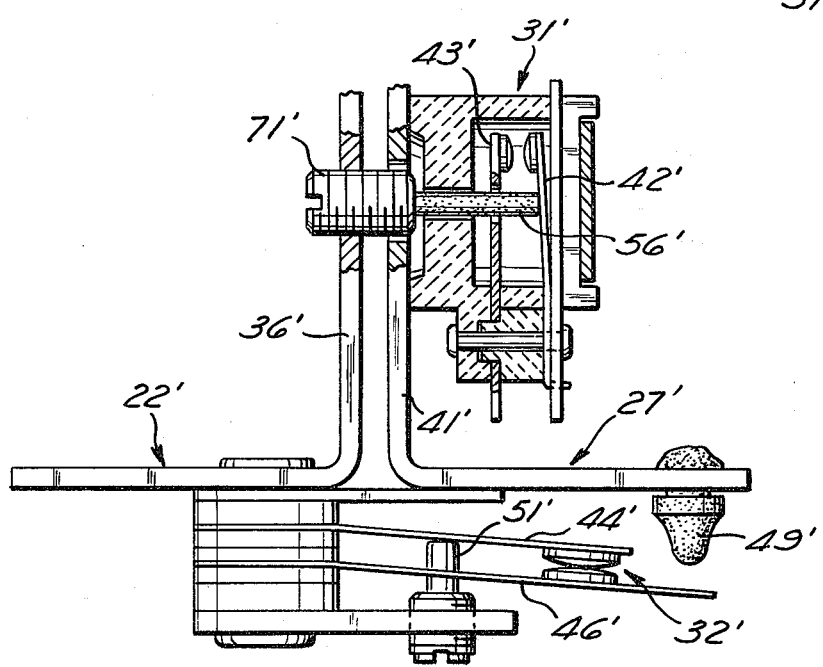
FIG. 3 is a side elevation of another thermostat control which can be used in the environment of FIG. 1.

FIG. 3 illustrates another embodiment of the thermostat which may be used in accordance with the present invention. In this embodiment, similar reference numerals will be used to designate parts of the thermostat of FIG. 3 with a prime (') added to indicate that reference is being made to the second embodiment, rather than the first embodiment of FIG. 3.

In the second embodiment thermostat, a frame 22' is provided with an upstanding projection 36' which is connected to the tube of the probe (not illustrated) in the same manner as in FIG. 2. The control arm 27' is again mounted for pivotal type movement with respect to the frame 22'. Here again, the rod of the probe (not illustrated) is connected to cause movement of the operator 27' in response to changes in temperature sensed by the probe.

Mounted on the upstanding projection 41' of the operator 27' is a first switch assembly 31' which includes a fixed contact arm 43' and a movable contact arm 42'. An operating bumper 56' engages an adjusting screw 71' mounted on the upstanding projection 36'. The screw 71' is adjusted so that the switch 31' closes and operates a signal device whenever the probe senses a temperature in excess of about 150°F. The second switch 32' is supported by the frame 22' and includes a fixed contact arm 44' and a movable contact arm 46'. An adjustable projection 51' determines the position of the fixed contact arm 44' and in turn determines the calibrated operating temperature of the switch 32'. The insulated bumper 49' engages the movable arm 46' and opens the switch 32' when the calibration temperature of the second switch 32' is reached. Here again, the switch 32' is calibrated to operate at a temperature in the order of 1100°F. and is connected to limit or terminate operation of the adjacent heaters. In the embodiment of FIG. 3, the switch 32' does not operate with snap action.

With the preferred embodiments of this invention, a single probe assembly functions to control two different switches at two different operating temperatures. The first switch is a normally open switch which closes at one calibration temperature, and the other switch 32 is a normally closed switch which is open at a second much higher calibration temperature. With the present invention, the two functions of protecting against burns and protecting the range top against damage are achieved in a single thermostat in which the operation and function of one switch is entirely independent of the other.

Although preferred embodiments of this invention are illustrated, it should be understood that various modifications and rearrangements of parts may be resorted to without departing from the scope of the invention disclosed and claimed herein.

What is claimed is:

1. A cooking range or the like comprising a smooth range top providing an upper surface for supporting and heating cooking utensils or the like, heating means spaced from and operable to supply heat to the lower surface of said range top, a warning signal device, and a thermostat providing a heat sensing assembly positioned between said range top and said heating means to sense the temperature of said range top and said heating means, said thermostat providing first and second switch means both operated by said sensing assembly, said first switch means being connected to operate said warning signal device whenever said range top is at a sufficient high temperature to cause a user to be burned if said range top is accidentally touched, said second switch means being connected to limit the operation of said heating means when the temperature of said range top reaches a temperature in excess of normal cooking temperatures and below a temperature at which said range top becomes damaged.

2. A cooking range as set forth in claim 1 wherein said heating sensing assembly is a rod and tube probe type sensing device positioned adjacent to the lower surface of said range top.

3. A cooking range as set forth in claim 2 wherein said first switch means is normally open and is closed when the temperature of said range top is higher than about 150°F.

4. A cooking range as set forth in claim 3 wherein said range top if formed of ceramic glass material, and said second switch means is normally closed and is opened when the temperature of said range top is no greater than about 1050°F.

5. A cooking range as set forth in claim 4 wherein said signal device is an electric light.

6. A cooking range as set forth in claim 5 wherein said heating means is an electric resistance heater.

7. A cooking range as set forth in claim 6 wherein said resistance heater is spaced from said range top, and said probe sensing device is positioned between said resistance heater and range top and extends across said resistance heater.

8. A cooking device as set forth in claim 2 wherein said heating means is an electric resistance heater spaced from said range top, and said probe sensing device is positioned between said resistance heater and range top and extends across said resistance heater.

9. A cooking range as set forth in claim 8 wherein an insulator confines the heat generated by said resistance heater to a localized portion of said range top, said insulation preventing substantial amounts of heat from reaching said first and second switch means.

10. A thermostat comprising body means, first and second switches on said body means each including a movable member movable relative to said body means to cause opening and closing of the associated switch, a thermally responsive probe assembly including first and second elements movable relative to each other in response to temperature changes, means respectively connecting said first element to said body means and said second element to said movable members, said members causing said first switch to be normally open and to close when the temperature of said probe reaches a predetermined first temperature and to remain closed at temperatures thereabove, said members causing said second switch to be normally closed and to open when the temperature of said probe reaches a predetermined second temperature higher than said first temperature and the remain open at temperatures above said second temperature.

11. A thermostat as set forth in claim 10 wherein said first predetermined temperature is no greater than about 150°F. and said predetermined second temperature is at least about 1100°F.

* * * * *